(No Model.)
2 Sheets—Sheet 1.
J. S. BRIGGS.
CORN HARVESTER.
No. 286,772.
Patented Oct. 16, 1883.
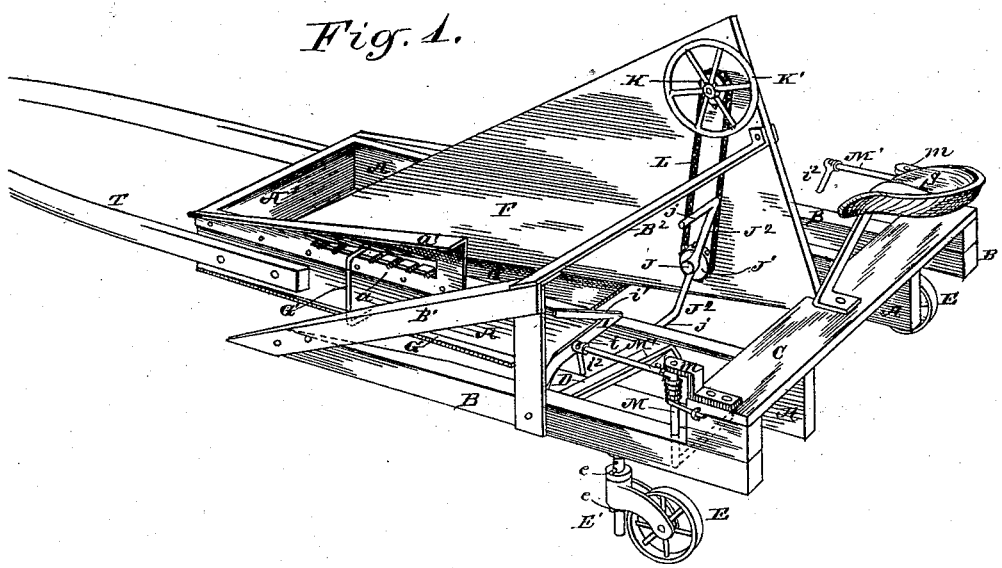
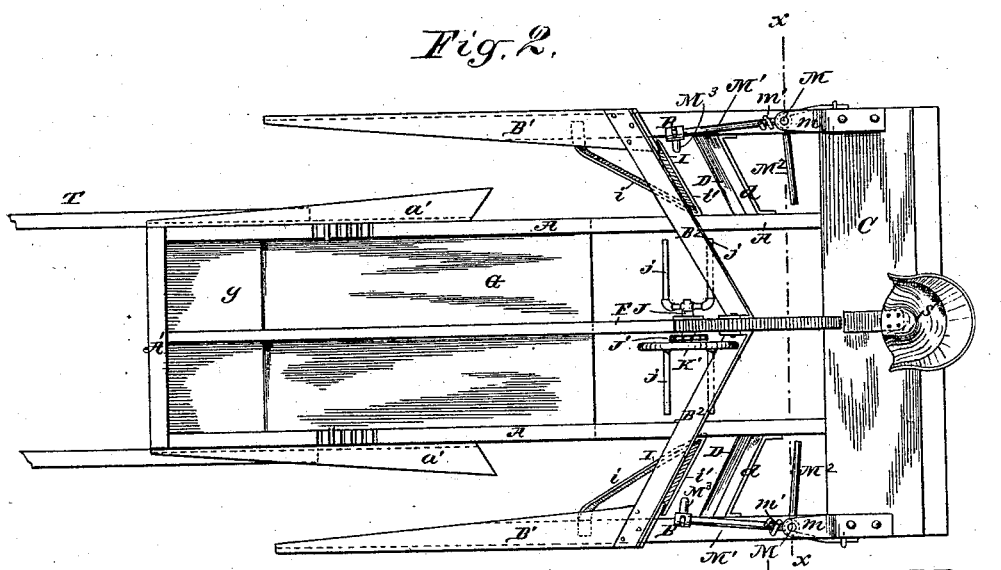
WITNESSES
D. W. Adams
C. C. Poole
INVENTOR
J. Smith Briggs.
per M. E. Dayton,
Attorney.

(No Model.) 2 Sheets—Sheet 2.

J. S. BRIGGS.
CORN HARVESTER.

No. 286,772. Patented Oct. 16, 1883.

WITNESSES
D. W. Adams
C. C. Poole

INVENTOR
J. Smith Briggs
per W. E. Dayton
Attorney

UNITED STATES PATENT OFFICE.

J. SMITH BRIGGS, OF KANKAKEE, ILLINOIS.

CORN-HARVESTER.

SPECIFICATION forming part of Letters Patent No. 286,772, dated October 16, 1883.

Application filed December 15, 1882. (No model.)

*To all whom it may concern:*

Be it known that I, J. SMITH BRIGGS, of Kankakee, in the county of Kankakee and State of Illinois, have invented certain new and useful Improvements in Corn-Harvesters; and I do hereby declare that the following is a full, clear, and exact description thereof, reference being had to the accompanying drawings, and to the letters of reference marked thereon, which form a part of this specification.

This invention relates to corn-harvesters, or machines for cutting standing corn in the field, and for delivering it in bunches in convenient form to be shocked.

It relates more particularly to machines having stationary cutters or knives arranged to sever the corn by being drawn against it in the forward movement of the machine.

Its object is to improve the construction of such machines and to increase their efficiency; and it consists in the matters hereinafter described, and pointed out in the claims.

Figure 3:
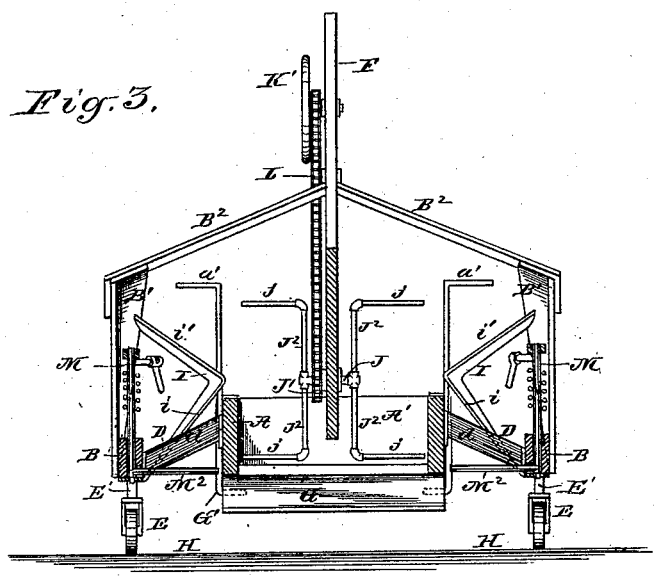
Figure 4:
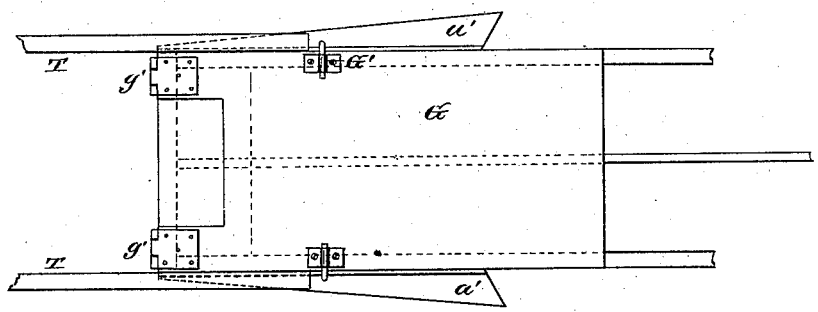
Figure 5:
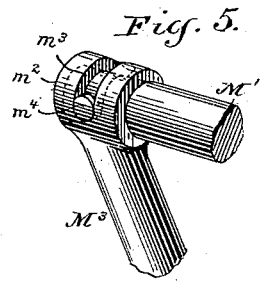

In the accompanying drawings, Figure 1 is a perspective view of a corn-harvester constructed as proposed by my invention. Fig. 2 is a plan view of the same. Fig. 3 is a transverse section on line $x$ $x$ of Fig. 2. Fig. 4 is a fragmentary view from beneath of the front part of the machine. Fig. 5 is a detail view, which will be described.

The machine, as here shown, is organized to simultaneously cut two parallel adjacent rows of corn and to deliver the corn cut from each row in bunches alongside of that cut from the other; and it consists, generally, of a central longitudinal frame adapted to pass between the two rows of corn to be cut, having attached to it on each side guide-pieces which pass outside of the said rows of corn, between which guide-pieces and the main frame the cutting-knives are placed. A pair of thills is attached to the main frame, by which it may be drawn by a single horse traveling between the rows or by two horses traveling tandem. At the front end the machine is supported by the thills, and at its rear end by two wheels attached to the outside guide-pieces and arranged to travel outside the rows being cut.

The main frame or body of the machine consists of two longitudinal frame-pieces, A A, and an end piece, A', and outside of and parallel with said main frame are placed two guide-pieces, B B, the pieces A and B being connected at the rear end of the machine by a cross-piece, C. The longitudinal frame A A A' is made of proper width to pass between the two rows of corn to be cut, and is preferably provided at its front end with two upwardly and outwardly inclined guides, $a'$. The guide-pieces B are arranged to run outside of the two contiguous rows of corn, and are provided with inclined guides B', which are pointed at their front ends and are inclined upwardly and inwardly, so as to bend the cornstalks toward the center of the machine as it is moved forward.

Between the beams A and B, at either side of the machine, are placed knives D, which are inclined upwardly, inwardly, and backwardly, and are adapted to cut the cornstalks at a suitable distance from the ground as the machine is drawn forward.

The rear portion of the machine is supported by wheels E, which are preferably caster-wheels pivoted and vertically adjustable upon a downwardly-projecting standard, E'.

Arranged centrally of the machine and parallel to the longitudinal frame-pieces is a dividing-board, F, which is to prevent the intermingling of the tops of the cornstalks as they are thrown inwardly from both sides of the machine during the operation of cutting, as will afterward be described. The dividing-board F is attached at its forward end to the front cross-piece, A, and at its rear end to the cross-piece C. As shown, it is triangular in shape, with its highest part near the rear of the machine.

At the forward part of the machine, and beneath the frame-pieces A, is attached a support, G, which is preferably hinged to the front of the frame, and is inclined downwardly and rearwardly, so as to ride near the surface of the ground between the corn-rows, and has its rear end adjustably supported, so that it can be sustained nearer to or farther from the ground, as desired. This apron is for the purpose of receiving and supporting the tops of the corn which are thrown forward upon it when cut, in the manner hereinafter described. Between the beams A and B, and in front of each of the cutters D, is placed a separator or laterally-operating divider, I, which is attached by a spring-connection at its lower end to the beam B. The lower portion, $i$, of the divider I is inclined upwardly and backwardly from its point of support to a point near and over the beam B. The divider I is, by means of its spring-connection, adapted to yield freely as the machine is drawn forward and allow the corn to pass by it to the cutter. The divider will be thrown inward after a hill of corn has passed it, and prevent such corn, after it is cut, from falling forward upon the standing corn. The corn which has passed behind the divider I, as described, will fall forward, after being cut, upon the inclined portion $i'$ of the said divider, and will be then thrown inwardly by the said incline $i'$, and over the frame-piece A upon the support G. The edge of the guide B' is inclined inwardly, as before described, and at its rear end is connected to the dividing-board F by means of a rearwardly-inclined brace-bar, $B^2$, which strikes the upper portion of the cornstalks before the knife reaches them, and inclines them forwardly, in which position the knife more readily severs them. It also inclines them inwardly, so that they will be in a position to fall toward the adjacent receptacle after being cut.

The knife D is in construction and operation essentially like that described in a former patent granted to S. C. Kenaga, No. 264,708, September 19, 1882. This knife is preferably attached to the lower portion of the beam B, and extends with a rearward inclination to the upper portion of the piece A, but may be otherwise attached, as found convenient or desirable. The said knife is provided with a vertical or nearly vertical back piece or plate, $d$, reaching upward from its rear margin, so as to catch and arrest the butts of the cut corn and prevent the same from slipping rearwardly over the knife to the ground.

It is intended that in the operation of the machine the corn shall be first inclined forwardly and inwardly by the inclined brace or bar $B^2$, so that when cut the tops will fall inside of the receptacle and upon the support G. In this operation the butts of the corn will fall across the upper edge or arm $i'$ of the divider I, and will be carried inward over the longitudinal side piece, A. In some cases the lower leaves of the cut corn prevent the butts from falling over said side piece; wherefore, in order to insure the proper delivery of the corn over the said beam, a special device is provided, which is actuated automatically by means of the standing cornstalks. Said device consists of a vertical shaft, M, pivoted in suitable bearings in the beam B, and a bracket, $m$, on the cross-piece C, having a rearwardly and downwardly extending arm, $M^2$, which extends transversely across the space between the pieces B and C, and in position to engage the standing corn-stubs, and to be by them thrown backward as it encounters and passes each hill of stubs. Said shaft is also provided with a forwardly-extending arm, M', having a depending finger, $M^3$, at its outer end, which, in the partial rotation of the shaft by the means above described, is thrown inward over and above the cutting-knife, so as to strike the butts of the cut corn and throw them over and inside the frame-pieces A. In order to accomplish this end more effectively, the finger $M^3$ is hinged so as to remain rigid in pressing the stalks inwardly, but so as to yield when the arm M' is returning to its normal position, that it may pass over any stalks that may be present in its path. The hinge by which said finger is joined to the arm is constructed with a suitable stop, to normally hold said finger dependent in a forwardly and downwardly inclined position, so as to operate in a degree to reach beneath and to lift the corn-butts over the outer frame-piece of the body. I preferably construct such hinged joint in the manner shown in Fig. 5, wherein the end of the finger $M^3$ is provided with a laterally-extended eye, $m^2$, which is placed over the end of the arm M', and is adapted to rotate thereon. In the eye $m^2$ is formed a segmental slot, $m^3$, made of sufficient length to allow sufficient movement to the finger, and the stud $m^4$ is so placed as to support the said finger in an inclined position for the purpose before described.

For the purpose of restoring the arms of the shaft M to their original position, a suitable spring, $m'$, is provided, preferably in the form of a coil, surrounding the vertical shaft M, and engaged with said shaft and an adjacent stationary part of the machine.

To assist in directing the corn-tops into the adjacent receptacle, the guides $a'$ may be employed, being secured in place above the side piece, A, and in advance of the divider I.

The support G is attached, at the front end of the machine, to a cross-piece, $g$, thereon, by means of hinges $g'$, and at the rear end is supported proximate to the ground by means of links or rods G', pivoted to the said support at each side, and having their upper ends bent inwardly, and adapted to rest in notches $a\ a$ in the top of the longitudinal frame-pieces A. By moving the upper ends of said links backward or forward in the notches $a$, the support may be adjusted and secured at any elevation desired. Any other means of adjustably supporting the support G may be used, and, if preferred, the rear end of said support may ride upon small caster-wheels; or it may be held up by a flexible chain or by a rod, which will allow it to rise and fall in case any obstruction passes beneath it.

At the rear of the support G, and on a line slightly forward of the knives, are placed two oppositely-arranged revoluble crank-shaped arms, $J^2\ J^2$, which are attached to a short horizontal shaft, J, having bearings in the lower portion of the dividing-board F. The horizontal extremities $j$ of the arms $J^2$ are arranged to extend across the spaces between the side pieces, A, and the central dividing-board, F, and at some distance in the rear of the support G, so that when depressed it forms a rest, upon which the butt-ends of the cut stalks will fall when thrown over the side piece, A, by the action of the devices before described.

Upon the shaft J is placed a sprocket-wheel, J', and in suitable bearings near the top of the divider-board F, or convenient to the divider, is located a corresponding sprocket-wheel, K, provided with a hand-wheel, K', and connected to the wheel J by means of a chain belt, L. By these means the driver may revolve the crank-arms so as to draw them rearwardly from beneath the corn when a sufficient quantity is accumulated thereon, to release the butts which are supported thereby and allow them to fall to the ground. By contact of the butts with the ground, the tops of the stalks are drawn off of the inclined support, and the cut corn is left in a position to be shocked.

In the duplex construction of the machine, as herein shown, the revolving crank-shaped arms J² on one side of the machine are connected rigidly with those of the other side by means of the shaft J, and are both rotated at the same time and in the same direction, so that the delivery is made at both sides of the machine simultaneously, and the two bunches of corn are delivered side by side. The object of having two oppositely-arranged crank-arms, J², on each side of the dividing-board F is, that one may take the place of the  er quickly, and thus prevent any corn falling to the ground, except at regular intervals.

At the rear of the machine a suitable driver's seat, S, is provided, which is supported on the cross-beam C, and is in such position that the operator can reach the hand-wheel K and revolve the crank-shaped arms J² from time to time and deliver the corn to the ground.

Ordinarily the machine will be managed so as to form substantially straight windrows across the field, in order that the shocker may pass along from one to the other, and stack as many bunches in the same windrow as will form a suitable shock.

The side beams of the main body of the machine extend downward far enough to inclose a suitable quantity of corn, and to prevent its dropping outward laterally off the apron; but at the same time there is sufficient space allowed to permit the support to rise and fall a short distance in case the latter inclines; or said apron may be adapted to rise between the side pieces in close proximity thereto, in which case said side pieces may extend more nearly to the ground.

The central division-board may be in the form of a vertical plate having a downwardly and forwardly inclined upper edge, as shown; or it may consist simply of a rod duly supported at its rear end and downwardly and forwardly inclined, as described, so as to accomplish the end set forth.

A suitable pair of thills, T, is attached to the forward ends of the longitudinal side pieces, to which the draft-horse is attached, and by which the front part of the machine is supported. The supporting-wheels E are placed on the ends of the rearwardly-projecting arms, E², pivoted in the standards E', and are vertically adjustable thereon by means of removable pins e, which pass through suitable apertures in the said standard, and may be placed so as to hold the said wheels in any position desired. The said supporting-wheels are pivoted as described, so that they may swing backward, in the ordinary manner of casters, and allow the entire body of the machine to sway laterally, as may be required to adjust them to the rows of corn in case the horse does not travel with perfect accuracy between them. In this manner the outer guide-pieces of the machine may be rigidly connected with the central body thereof, and that pivotal construction of the outer guide-pieces avoided which is illustrated in the Kenaga and Briggs patent, No. 264,709, dated September 19, 1882, thus simplifying the construction of the machine, while insuring its perfect operation. The adjustment of the machine to one row of corn is of course accompanied by its adjustment with the adjacent one, for the reason that, as now practiced, the corn is planted by machinery in accurately parallel rows.

In corn-harvesters as heretofore constructed the upwardly-inclined outer guide-pieces, B', for throwing the tops of the corn inwardly, have been made of a rod of metal or wood, and of small cross-sectional dimensions. In the use of such a rod the ears of corn, as the machine advances, fall and hang over the rod, and are at last broken off the stalk. To remedy this objectionable feature of the machine, I make the upper surface of the guide-pieces broad and flat, preferably giving them a regular widening taper from their forward ends to their points of attachment to the bars B², as shown in the drawings. In the operation of the guide-piece so constructed the ears are lifted and thrown inwardly by encountering the broad surface of the guide without danger of being stripped from the stalks. The bar B² is provided with a broad top surface in the same manner and for the same purpose as in the case of the guide B', as shown. The top surface of the guide B' and bar B² may obviously be inwardly inclined and their edges rounded, so as to still more effectually prevent the removal of the ears from the stalks by their contact with said ears.

I claim as my invention—

1. In a corn-harvester, the combination, with the knife, of a laterally-yielding divider located in front of the knife, and a spring by which said divider is forced between adjacent hills of corn, substantially as described.

2. In a corn-harvester, the combination, with the central frame of the machine, of a partial support, G, for the cut corn, and means for adjusting said support vertically upon said frame, substantially as described.

3. In a corn-harvester, the combination, with the knife, of a support, G, for the cut corn, said support being pivoted at its front end to the frame of the machine, and adjustably held at its rear end, substantially as described.

4. The combination, with the cutting-knife, the receptacle, and means for directing the tops of the cut corn into the receptacle, of means actuated by the standing corn-stubs for throwing the butts of the cut corn into the receptacle, substantially as described.

5. The combination, with the two knives arranged to cut two adjacent rows of corn, with the receptacle intermediate to said knives, and with means for directing the falling corn from both sides inwardly to said receptacle, of a central division-board for preventing the corn falling from opposite sides of the machine from becoming interlocked, substantially as described.

6. In combination with the stationary knife and the adjacent receptacle, the outwardly-inclined guide $a'$, the inwardly-inclined guide $B'$, and the inclined bar $B^2$, substantially as and for the purposes specified.

7. In combination with the vertically-adjustable support G, the supporting-rods $G'$, pivoted to said apron and adjustably attached to the frame of the machine, substantially as and for the purposes specified.

8. In combination with the support G, for supporting the tops of the cut corn, the oppositely-arranged crank-shaped arms $J^2$, and means for rotating the same, substantially as and for the purpose set forth.

9. In a duplex machine, the combination, with a central support, of a shaft, J, crank-arms $J^2$, a hand-wheel, K, and means for rotating the shaft J from the said hand-wheel, substantially as described.

10. In a corn-harvester, the laterally-movable divider I, attached to the guide-piece B by a spring-connection, and having an upwardly, inwardly, and backwardly inclined portion, $i$, and having its upper portion, $i'$, downwardly and inwardly inclined, substantially as and for the purpose set forth.

11. In a corn-harvester, the combination, with a knife, an inner longitudinal receptacle, and means for directing the tops of the cut corn to said receptacle, of a pivoted vertical shaft, M, provided with an arm arranged to encounter the standing corn-stubs, and an arm adapted to carry the butts of the cut corn inwardly to the receptacle, substantially as described.

12. In combination with the shaft M, provided with arms, for the purposes stated, a spring adapted to hold its lower arm normally across the path of the corn-stubs, and to yield so as to allow the said arm to be thrown backward by said stubs, substantially as described.

13. The combination, with the vertical shaft M and the arm $M^2$, arranged to strike the corn-stubs, of a forwardly-projecting arm, $M'$, provided with a hinged finger, $M^3$, substantially as and for the purpose set forth.

14. In combination with the laterally-vibrating arm $M'$, a hinged finger, $M^3$, arranged to remain rigid when pressing the cornstalks inward, and to yield to any obstruction in its outward movement, substantially as described.

15. In a corn-harvester, the combination, with a knife, of an upwardly and rearwardly inclined guide, $B'$, having a broad upper surface at its rear portion, substantially as described.

16. In a corn-harvester, the combination, with the knife and with a receptacle adjacent thereto, of the guide $B'$ and bar $B^2$, said guide and bar having broad upper surfaces, substantially as and for the purpose set forth.

In testimony that I claim the foregoing as my invention I affix my signature in presence of two witnesses.

J. SMITH BRIGGS.

Witnesses:
M. E. DAYTON,
JESSE COX, Jr.